United States Patent [19]
Ovshinsky et al.

[11] Patent Number: 5,616,432
[45] Date of Patent: *Apr. 1, 1997

[54] ELECTROCHEMICAL HYDROGEN STORAGE ALLOYS AND BATTERIES FABRICATED FROM MG CONTAINING BASE ALLOYS

[75] Inventors: Stanford R. Ovshinsky, Bloomfield Hills; Michael A. Fetcenko, Rochester Hills; Benjamin Reichman, West Bloomfield; Kwo Young; Benjamin Chao, both of Troy; Jun Im, Sterling Heights, all of Mich.

[73] Assignee: Ovonic Battery Company, Inc., Troy, Mich.

[ * ] Notice: The term of this patent shall not extend beyond the expiration date of Pat. No. 5,506,069.

[21] Appl. No.: 436,673

[22] Filed: May 8, 1995

Related U.S. Application Data

[63] Continuation-in-part of Ser. No. 259,793, Jun. 14, 1994, Pat. No. 5,506,069, and a continuation-in-part of Ser. No. 423,072, Apr. 17, 1995, Pat. No. 5,536,591.

[51] Int. Cl.$^6$ ............................................. H01M 4/38
[52] U.S. Cl. ........................... 429/59; 75/333; 216/108; 420/402; 420/441; 420/900
[58] Field of Search ........................... 429/59; 420/402, 420/441; 216/108, 109; 75/333; 164/113

[56] References Cited

U.S. PATENT DOCUMENTS

| | | | |
|---|---|---|---|
| 4,588,480 | 5/1986 | Thoma | 216/108 X |
| 4,623,597 | 11/1986 | Sapru et al. | 429/101 |
| 4,948,423 | 8/1990 | Fetcenko et al. | 75/10.14 |
| 5,219,678 | 6/1993 | Hasebe et al. | 420/900 X |
| 5,506,069 | 4/1996 | Ovshinsky et al. | 429/59 |

Primary Examiner—Stephen Kalafut
Attorney, Agent, or Firm—Marc J. Luddy; Marvin S. Siskind; David W. Schumaker

[57] ABSTRACT

A disordered multicomponent MgNi based electrochemical hydrogen storage material having a microstructure including a substantial volume fraction characterized by intermediate range order and exhibiting extraordinarily high storage capacity and methods of fabricating same.

65 Claims, 8 Drawing Sheets

ELECTROCHEMICAL HYDROGEN STORAGE ALLOYS AND BATTERIES FABRICATED FROM MG CONTAINING BASE ALLOYS

The present invention is a continuation-in-part of U.S. patent application Ser. No. 08/259,793 filed Jun. 14, 1994 titled ELECTROCHEMICAL HYDROGEN STORAGE ALLOYS AND BATTERIES FABRICATED FROM MG CONTAINING BASE ALLOYS now U.S. Pat. No. 5,506, 069; and U.S. patent application Ser. No. 08/423,072 filed Apr. 17, 1995, titled IMPROVED ELECTROCHEMICAL HYDROGEN STORAGE ALLOYS FOR NICKEL METAL HYDRIDE BATTERIES now U.S. Pat. No. 5,536,591.

FIELD OF THE INVENTION

The present invention relates to electrochemical hydrogen storage alloys and rechargeable electrochemical cells using these alloys.

More particularly, the invention relates to nickel metal hydride (Ni-MH) rechargeable cells and batteries having negative electrodes formed of disordered MgNi based electrochemical hydrogen storage alloys. In addition to reduced cost, cells that incorporate the alloys of the invention have electrochemical performance characteristics that are as good as or better than known rechargeable cells using hydrogen storage alloys, such electrochemical performance characteristics including cycle life, charge retention, low temperature, energy density, and especially high storage capacity. Another embodiment of the invention focusses on the particular fabrication and characterization of chemically and structurally modified MgNi alloys that provide remarkable improvements in storage capacity as well as other electrochemical performance characteristics.

BACKGROUND OF THE INVENTION

In rechargeable alkaline cells, weight and portability are important considerations. It is also advantageous for rechargeable alkaline cells to have long operating lives without the necessity of periodic maintenance. Rechargeable alkaline cells are used in numerous consumer devices such as portable computer, video cameras, and cellular phones. They are often configured into a sealed power pack that is designed as an integral part of a specific device. Rechargeable alkaline cells can also be configured as larger cells that can be used, for example, in industrial, aerospace, and electric vehicle applications.

For more than three decades, virtually every battery manufacturer in the world studied the NiMH battery technology, but no commercial battery of this kind existed until after the publication of U.S. Pat. No. 4,623,597 to Sapru, Reger, Reichman, and Ovshinsky which disclosed Ovshinsky's basic and fundamentally new principles of battery material design. Stanford R. Ovshinsky was responsible for inventing new and fundamentally different electrochemical electrode materials. As predicted by Ovshinsky, reliance on simple, relatively pure compounds was a major shortcoming of the prior art. Relatively pure crystalline compounds were shown to have a low density of hydrogen storage sites, and the type of active sites available occurred accidently and were not designed into the bulk of the material. Thus, the efficiency of the storage of hydrogen and the subsequent release of hydrogen to form water was determined to be poor. By applying his fundamental principles of disorder to electrochemical hydrogen storage, Ovshinsky drastically departed from conventional scientific thinking and created a disordered material having an ordered local environment where the entire bulk of the material was provided with catalytically active hydrogen storage sites as well as other sites which provided the required thermodynamic absorption and release necessary for electrochemical activity.

Short-range, or local, order is elaborated on in U.S. Pat. No. 4,520,039 to Ovshinsky, entitled *Compositionally Varied Materials and Method for Synthesizing the Materials*, the contents of which are incorporated by reference. This patent disclosed that disordered materials do not require any periodic local order and how spatial and odentational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment and/or orbital overlap plays a significant role physically, electronically, or chemically so as to affect physical properties and hence the functions of the materials. The elements of these materials offer a variety of bonding possibilities due to the multidirectionality of d-orbitals. The multidirectionality ("porcupine effect") of d-orbitals provides for a tremendous increase in density and hence active storage sites. These techniques result in means of synthesizing new materials which are disordered in several different senses simultaneously.

Ovshinsky had previously shown that the number of surface sites could be significantly increased by making an amorphous film in which the bulk thereof resembled the surface of the desired relatively pure materials. Ovshinsky also utilized multiple elements to provide additional bonding and local environmental order which allowed the material to attain the required electrochemical characteristics. As Ovshinsky explained in *Principles and Applications of Amorphicity, Structural Change, and Optical Information Encoding*, 42 Journal De Physique at C4-1096 (October 1981):

> Amorphicity is a generic term referring to lack of X-ray diffraction evidence of long-range periodicity and is not a sufficient description of a material. To understand amorphous materials, there are several important factors to be considered: the type of chemical bonding, the number of bonds generated by the local order, that is its coordination, and the influence of the entire local environment, both chemical and geometrical, upon the resulting varied configurations. Amorphicity is not determined by random packing of atoms viewed as hard spheres nor is the amorphous solid merely a host with atoms imbedded at random. Amorphous materials should be viewed as being composed of an interactive matrix whose electronic configurations are generated by free energy forces and they can be specifically defined by the chemical nature and coordination of the constituent atoms. Utilizing multi-orbital elements and various preparation techniques, one can outwit the normal relaxations that reflect equilibrium conditions and, due to the three-dimensional freedom of the amorphous state, make entirely new types of amorphous materials—chemically modified materials . . .

Once amorphicity was understood as a means of introducing surface sites in a film, it was possible to produce "disorder" that takes into account the entire spectrum of effects such as porosity, topology, crystallites, characteristics of sites, and distances between sites. Thus, rather than searching for material changes that would yield ordered materials having a maximum number of accidently occurring surface bonding and surface irregularities, Ovshinsky and his team at ECD began constructing "disordered" materials where the desired irregularities were tailor made. See, U.S. Pat. No. 4,623,597, the disclosure of which is incorporated by reference.

The term "disordered", as used herein to refer to electrochemical electrode materials, corresponds to the meaning of the term as used in the literature, such as the following:

> A disordered semiconductor can exist in several structural states. This structural factor constitutes a new variable with which the physical properties of the [material] . . . can be controlled. Furthermore, structural disorder opens up the possibility to prepare in a metastable state new compositions and mixtures that far exceed the limits of thermodynamic equilibrium. Hence, we note the following as a further distinguishing feature. In many disordered [materials] . . . it is possible to control the short-range order parameter and thereby achieve drastic changes in the physical properties of these materials, including forcing new coordination numbers for elements . . .

S. R. Ovshinsky, *The Shape of Disorder*, 32 *Journal of Non-Crystalline Solids* at 22 (1979) (emphasis added).

The "short-range order" of these disordered materials are further explained by Ovshinsky in *The Chemical Basis of Amorphicity: Structure and Function*, 26:8–9 *Rev. Roum. Phys.* at 893–903 (1981):

> [S]hort-range order is not conserved . . . Indeed, when crystalline symmetry is destroyed, it becomes impossible to retain the same short-range order. The reason for this is that the short-range order is controlled by the force fields of the electron orbitals therefore the environment must be fundamentally different in corresponding crystalline and amorphous solids. In other words, it is the interaction of the local chemical bonds with their surrounding environment which determines the electrical, chemical, and physical properties of the material, and these can never be the same in amorphous materials as they are in crystalline materials . . . The orbital relationships that can exist in three-dimensional space in amorphous but not crystalline materials are the basis for new geometries, many of which are inherently anti-crystalline in nature. Distortion of bonds and displacement of atoms can be an adequate reason to cause amorphicity in single component materials. But to sufficiently understand the amorphicity, one must understand the three-dimensional relationships inherent in the amorphous state, for it is they which generate internal topology incompatible with the translational symmetry of the crystalline lattice . . . What is important in the amorphous state is the fact that one can make an infinity of materials that do not have any crystalline counterparts, and that even the ones that do are similar primarily in chemical composition. The spatial and energetic relationships of these atoms can be entirely different in the amorphous and crystalline forms, even though their chemical elements can be the same . . .

Based on these principles of disordered materials, described above, three families of extremely efficient electrochemical hydrogen storage negative electrode materials were formulated. These families of negative electrode materials, individually and collectively, will be referred to hereinafter as "Ovonic." One of the families is the $La\text{-}Ni_5$-type negative electrode materials which have recently been heavily modified through the addition of rare earth elements such as Ce, Pr, and Nd and other metals such as Mn, Al, and Co to become disordered multicomponent alloys, i.e., "Ovonic". The second of these families is the Ti-Ni-type negative electrode materials which were introduced and developed by the assignee of the subject invention and have been heavily modified through the addition of transition metals such as Zr and V and other metallic modifier elements such as Mn, Cr, Al, Fe, etc. to be disordered, multicomponent alloys, i.e., "Ovonic." The third of these families are the disordered, multicomponent MgNi-type negative electrode materials described herein.

Based on the principles expressed in Ovshinsky's '597 Patent, the Ovonic Ti-V-Zr-Ni type active materials are disclosed in U.S. Pat. No. 4,551,400 to Sapru, Fetcenko, et al. ("the '400 Patent"), the disclosure of which is incorporated by reference. This second family of Ovonic materials reversibly form hydrides in order to store hydrogen. All the materials used in the '400 Patent utilize a Ti-V-Ni composition, where at least Ti, V, and Ni are present with at least one or more of Cr, Zr, and Al. The materials of the '400 Patent are generally multiphase polycrystalline materials, which may contain, but are not limited to, one or more phases of Ti-V-Zr-Ni material with $C_{14}$ and $C_{15}$ type crystal structures. Other Ovonic Ti-V-Zr-Ni alloys are described in commonly assigned U.S. Pat. No. 4,728,586 ("the '586 Patent"), titled *Enhanced Charge Retention Electrochemical Hydrogen Storage Alloys and an Enhanced Charge Retention Electrochemical Cell*, the disclosure of which is incorporated by reference.

The characteristic surface roughness of the metal electrolyte interface is a result of the disordered nature of the material as disclosed in commonly assigned U.S. Pat. No. 4,716,088 to Reichman, Venkatesan, Fetcenko, Jeffries, Stahl, and Bennet, the disclosure of which is incorporated by reference. Since all of the constituent elements, as well as many alloys and phases thereof, are present throughout the metal, they are also represented at the surfaces and at cracks which form in the metal/electrolyte interface. Thus, the characteristic surface roughness is descriptive of the interaction of the physical and chemical properties of the host metals as well as of the alloys and crystallographic phases of the alloys, in an alkaline environment. The microscopic chemical, physical, and crystallographic parameters of the individual phases within the hydrogen storage alloy material are important in determining its macroscopic electrochemical characteristics.

In addition to the physical nature of its roughened surface, it has been observed that V-Ti-Zr-Ni type alloys tend to reach a steady state surface condition and particle size. This steady state surface condition is characterized by a relatively high concentration of metallic nickel. These observations are consistent with a relatively high rate of removal through precipitation of the oxides of titanium and zirconium from the surface and a much lower rate of nickel solubilization. The resultant surface has a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

The surface of the negative electrode, which has a conductive and catalytic component—the metallic nickel—interacts with metal hydride alloys in catalyzing the electrochemical charge and discharge reaction steps, as well as promoting fast gas recombination.

Despite the exceptional electrochemical performance now provided by Ovonic, highly disordered nickel metal hydride systems (twice the hydrogen storage capacity of NiCd systems), consumers are demanding increasingly greater run times and power requirements from such rechargeable battery systems. No current battery system can meet these ever-increasing demands. Accordingly, there exists a need for an ultra high capacity, long charge retention, high power delivery, long cycle life, reasonably priced rechargeable battery system.

SUMMARY OF THE INVENTION

It was to meet the requirements demanded by consumers as set forth in the previous paragraph utilizing low cost, high capacity and applying Ovshinsky's principles of disorder that the Ovonic MgNi based negative electrode materials of the instant invention were developed.

Applying principles of patent law, the subject inventors now define the negative electrode alloy materials described and claimed herein as including a substantial volume fraction of an amorphous, nanocrystalline and/or microcrystalline microstructure and will hereinafter refer to that microstructure by the term "intermediate range order." It should be understood by those of ordinary skill in the art that nanocrystallines are typically about 10–50 Angstroms in size and more specifically 20–50 Angstroms in size. The reader should understand that crystallites in the 10–50 Angstrom size range display a special characteristic due to the unique topology, surface area to bulk ratio, unusual bonding configurations and enhanced number of active sites. It is to be understood, as more completely explained hereinafter, that a volume fraction of the microstructure of the negative electrode alloy materials may also include significant polycrystalline inclusions; however, the electrochemical performance of the electrode will suffer in relation to volume fraction of those polycrystalline inclusions.

One aspect of the present invention is a Mg based electrochemical hydrogen storage material comprising:

(Base Alloy)$_a$M$_b$ where, Base Alloy is an alloy of Mg and Ni in a ratio of from about 1:2 to about 2:1; M represents at least one modifier element chosen from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, and Ca; b is from 0.5–30, preferably 5–15, atomic percent; and a+b=100 atomic percent; and where the MgNi based electrochemical hydrogen storage material exhibits a microstructure including a substantial volume fraction characterized by intermediate range order. Other microstructural portions of polycrystallites may also be present. In addition, powder particles of these materials are from 1–75 microns, preferably 5–38 microns.

Another aspect of the invention is an electrochemical hydrogen storage cell comprising: a disordered negative electrode comprising an alloy of Mg and Ni in a ratio of from about 1:2 to about 2:1; and at least one modifier element chosen from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, and Ca where the total mass of said at least one modifier is 0.5–30, preferably 5–15, atomic percent of said alloy; where said MgNi based electrochemical hydrogen storage material exhibits a microstructure including a substantial volume fraction characterized by intermediate range order; a positive electrode; and a separator.

Another aspect of the invention involves a method for fabricating an MgNi based electrochemical hydrogen storage material comprising the step of: mechanically alloying Mg and Ni in a ratio of from about 1:2 to about 2:1 and at least one modifier element chosen from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, and Ca where the total mass of said at least one modifier element is greater than 0.5 atomic percent and less than 30 atomic percent to produce an MgNi based electrochemical hydrogen storage material having a microstructure including a substantial volume fraction characterized by intermediate range order.

Another aspect of the present invention is a method for fabricating a multicomponent disordered MgNi based electrochemical hydrogen storage material comprising the steps of: rapidly solidifying an alloy of Mg and Ni in a ratio of from about 1:2 to about 2:1 modified using at least one modifier element chosen from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, and Ca where the total mass of said at least one modifier element is greater than 0.5 atomic percent and less than 30 atomic percent. The rapidly solidified alloy which promotes a non-equilibrium structure may then be mechanically alloyed and/or thermally annealed to produce a microstructure including a substantial volume fraction characterized by intermediate range order, preferably having crystallites on the order of about 20–50 Å in size. Using the "multiple nozzle" approach described hereinafter, this optimized microstructure can be achieved in a production oriented process.

Another aspect of the invention is a disordered MgNi based electrochemical hydrogen storage material comprising:

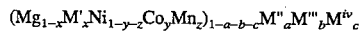

$(Mg_{1-x}M'_xNi_{1-y-z}Co_yMn_z)_{1-a-b-c}M''_aM'''_bM^{iv}_c$ where x is 0.1 to 6.0 atomic percent; y is 0.1 to 8.5, preferably 2.5 to 5.5 atomic percent; z is 0.1 to 8.5, preferably 4.5 to 8.5 atomic percent; a is 0.1 to 6 atomic percent; b is 0.1 to atomic percent; c is 0.1 to 3 atomic percent; d is 0.1 to 8 atomic percent; M' is chosen from the group consisting of Ca, Be, and y; M" is chosen from the group consisting of V, Ti, Zr, Cr, Al, Fe, and Sn; M''' is chosen from the group consisting of B, Bi, In, and Sb; and M$^{iv}$ is chosen from the group consisting of Cu, Th, Si, Zn, Li, La, Ce, Pr, Nd, Mm, and F.

DETAILED DESCRIPTION OF THE INVENTION

Figure 1:
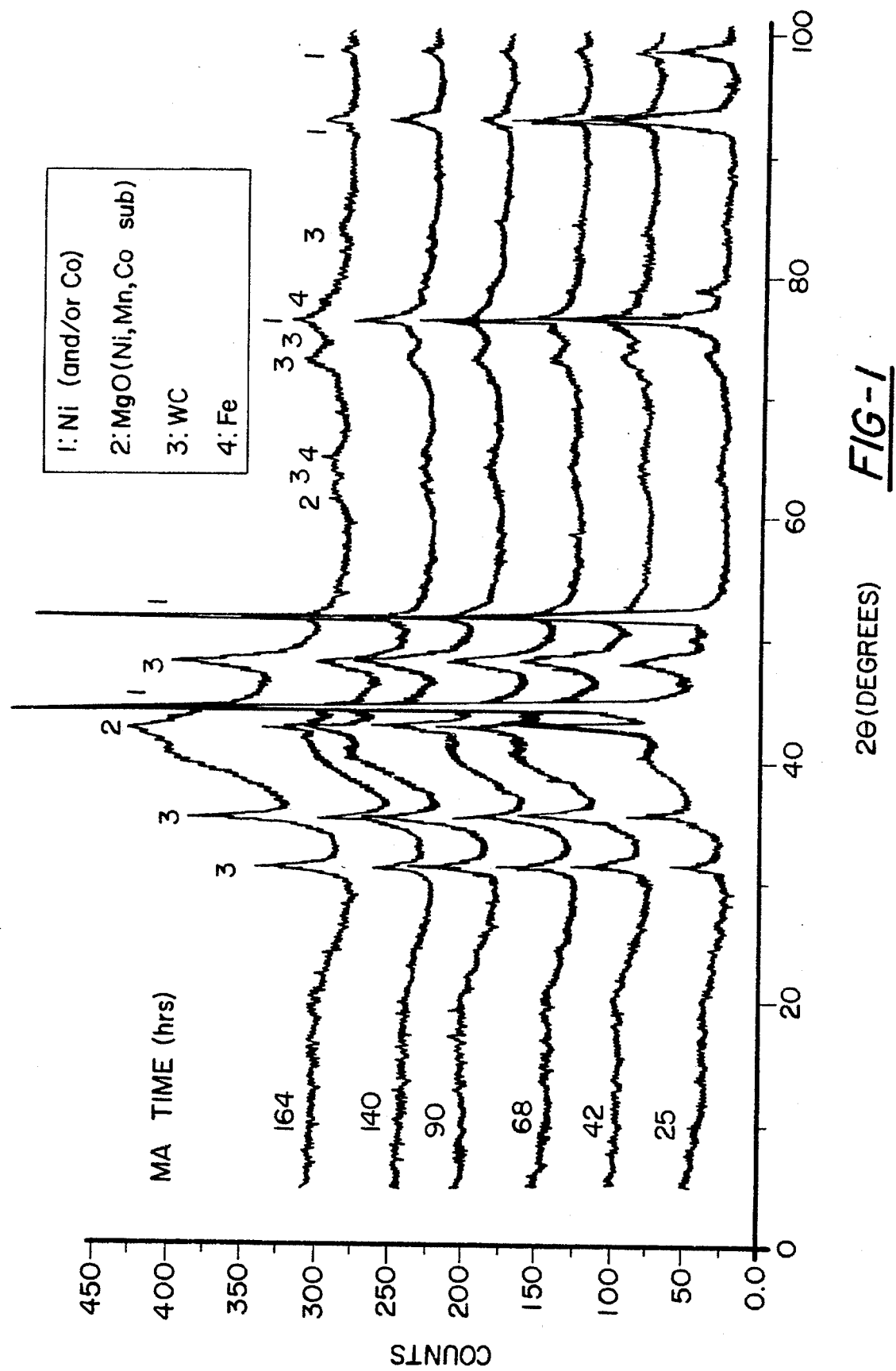
FIG. 1 shows the XRD spectra of the preferred microstructure of the present invention compared with less desirable materials.

The present invention describes the electrochemical performance, methods of preparation, and characterization of the microstructure for Ovonic MgNi based alloys.

Mg-Ni disordered materials were first disclosed by Ovshinsky, et al. in U.S. Pat. No. 4,623,597. The instant invention addresses improved chemical and metallurgical processing taking into consideration the dissimilar melting points and vapor pressure of constituent elements as well as the ready oxidation Mg in an alkaline environment. In addition, the instant invention addresses the fact that particular care must be taken for Mg substitutions because Mg has a different atomic radius compared to host metals used in the other families of advanced Ovonic Ni-MH materials. As a result of the experience gained from developing Ovonic Ti-Ni based alloys of every increasing complexity, Ovshinsky and his team have now invented a family of improved Ovonic Mg-Ni based electrode materials for battery systems that will far surpass the anticipated electrochemical performance of any negative electrode battery system currently being manufactured or under development.

With respect to the Ovonic MgNi system, Ni is thermodynamically destabilizing in the MH alloy. This destabilization acts to decrease the bonding strength of Mg, V, Ti, and Zr with hydrogen into a useful range for electrochemical application. Ni is also useful because it provides corrosion resistance and catalysis in an alkaline environment.

The present invention represents a fundamental change from the highly modified multicomponent materials that have been developed from disordered materials made from either d-type orbitals or f-type orbitals. The present invention uses Ovonic MgNi as the basis of a new family of disordered negative electrode materials. This work required a comprehensive analytical approach. First, the inventors sought multi-orbital modifiers, for example transition elements, that would provide a greatly increased number of active sites due to the various bonding configurations available in order to produce an increase in energy density. Second, the inventors looked for modifiers and methods that would stabilize Mg as well as provide sufficient balance to the passivation/corrosion characteristics of the resulting alloy. Of course, unrestrained corrosion leads to poor cycle life and passivation results in low capacity, poor discharge rate performance, and poor cycle life.

The inventors also realized that unlike the prior art hydrogen storage-based materials that typically utilize a polycrystalline microstructure, Ovonic MgNi based alloys cannot operate successfully if they are substantially polycrystalline. Modified MgNi based alloys for electrochemical applications must have a microstructure that is characterized by a substantial volume fraction of intermediate range order.

The importance of the intermediate range order microstructure in the MgNi based system of the present invention cannot be overstated. Polycrystalline hydrogen storage materials based on MgNi alloys are well known in the art for use in high temperature gas phase applications. Such polycrystalline MgNi based materials are totally unsuitable for electrochemical applications because their metal hydrogen bond strength is much too high for practical electrochemical applications.

Modification of MgNi materials is complicated because Mg does not have the tolerance for substitution that transition metals or rare earth elements have. Further, MgNi based materials do not tolerate the wide latitude of precipitated phases formed during alloy solidification. In other words, Ovonic alloys of the V-Ti-Zr-Ni type or Ovonic alloys of the LaNi$_5$ -type may precipitate as a multitude of crystallographic phases during solidification and still result in efficiently operating alloys capable of operating in an alkaline battery environment. This is problematic with MgNi based materials in that the precipitated phases fall well outside of proper thermodynamic constraints by virtue of the fact that there is no Mg:Ni 1:1 ratio intermetallic naturally formed upon solidification from the melt.

The Ovonic MgNi host matrix materials of the present invention are high specific capacity electrochemical hydrogen storage alloys composed of a Base Alloy comprising a MgNi host matrix. This MgNi host matrix is an alloy of Mg and Ni in a ratio of about 1:2 to about 2:1, preferably about 1:1. The Base Alloy of the invention is modified by at least one modifier element chosen from the group consisting of Co, Mn, Al, Fe, Cu, Mo, W, Cr, V, Ti, Zr, Sn, La, Ce, Pr, Nd, Mm, Pd, Pt, and Ca where the total mass of the at least one modifier element is greater than 0.5, preferably 2.5, atomic percent and less than 30 atomic percent of the final composition.

The language "at least one modifier" is specifically used herein to mean one, two, three, four, or more modifiers.

U.S. Pat. No. 5,506,069 to Ovshinsky and Fetcenko (the disclosure of which are specifically incorporated by reference) described the preparation of MgNi alloys via rapid solidification such as jet casting, melt spinning, gas atomization, ultrasonic atomization, centrifugal atomization, and planar flow casting. Such rapid solidification techniques are also applicable to the present invention.

Methods and apparatus described in Ovshinsky, et al.'s U.S. Pat. No. 4,339,255 (the disclosure of which are incorporated by reference) for the formation of highly disordered materials can be advantageously employed in the present invention. This patent describes rapidly quenching multiple streams of material (such as a stream of Base Alloy and a stream of modifier elements) where the flow and quench rate of each of the multiple streams of material are independently controlled. With respect to the present invention, this technique is particularly useful with modifier(s) of very low melting points or with modifier(s) that have quite different mechanical/metallurgical characteristics as compared to those of the host MgNi material.

The method and apparatus disclosed in the '255 patent differ from the teachings of prior art by providing a modifying element(s) which can be introduced into the matrix so that it can enter thereinto with its own independent, separately controllable, quench rate. Thus the modifying element(s) can be frozen into the host matrix so as not only to enter the primary bonding of the material to become part of the alloy, but most importantly to be frozen into the alloy in a non-equilibrium manner.

Such modifying element(s) can be added by providing relative motion between the matrix and the modifying element(s), such as by providing one or more additional streams such as a second stream of material, directed from a second nozzle, in a metal spinning apparatus, the second nozzle being at the outlet of a reservoir of a fluid modifier material. Such second nozzle is arranged to direct the fluid modifier material toward the substrate in a stream which converges with the stream of metallic host matrix material being directed onto the substrate from a first nozzle at or before the host material makes contact with the substrate.

By controlling the various properties and configurations of the modified material, the electrical, chemical, thermal or physical characteristics of the material are independently controllable. The independent control of the material characteristics, such as the three dimensional bonding and anti-bonding relationships and positions are not normally seen in crystalline materials, at least not in large and controllable numbers. This is especially true for a d band or multiple orbital modifier element. The d band or multiple orbital modifier elements enable the modified materials to have stable, but non-equilibrium orbital configurations frozen in by the independently controllable quench rate.

In a melting process, the relationship and cooling rate of the matrix and added modifier element(s) would allow the added element to be incorporated in the normal matrix structural bonds. The timing of the introduction of the modifier element(s) can be controlled independently of any crystalline constraints. The flow rate of the modifier element can be controlled and may be varied or intermittent and may incorporate gaseous modifier element(s) in the stream or environment. By independently controlling the environment, quench and flow rates and timing a new bulk material or alloy can be formed with the desired properties, which does not have a counterpart in crystalline materials.

By quenching the modified molten metal or molten metallic alloy, at a high quenching rate, a modified highly disordered ribbon can be attained which, because it has been frozen in the amorphous as opposed to the crystalline state, and which is modified, will have a significant number of disassociation points for molecules and bonding points, i.e., high valence atoms with many untilled or unconnected valence positions, which provide bonding points for free atoms of a gas so that the material has utility in storing gases and which can provide a material that can simulate the catalytic chemical properties of a metal or host matrix.

An additional process embodied in the present invention involves the use of mechanical alloying wherein the component elements are added together in a high energy mechanical alloying process such as an attriter or high energy ball mill. Grinding for 40–175 hours produces the desired microstructure characterized by intermediate range order. For example (as discussed in detail below), $Mg_{52}Ni_{39}Co_3Mn_6$ alloys were produced that have hydrogen storage capacities between 400–800 mAh/g.

It was shown that an optimum grinding time exists for each specific alloy composition, batch size, and machine. At this optimum time, the microstructure of the material changes from individual elemental constituents to a microstructure including a substantial volume fraction thereof characterized by intermediate range order as evidenced by x-ray diffraction testing and lack of phase segregation via SEM analysis under back scattered electron imaging. A volume fraction of polycrystalline inclusions can be tolerated but will detract from the performance characteristics. Electrochemical capacity increased as grinding time increased before reaching a peak. If this optimum is exceeded, capacity decreases as the physical structure of the material changes to an agglomeration of large particles.

Said differently, peak capacity of the Ovonic MgNi based alloys of the present invention was achieved with fine powder particles all having a microstructure including a substantial volume fraction characterized by intermediate range order. Further grinding did not change or alter the microstructure as evidenced by x-ray diffraction, but did in fact cause small powder particles in the range of 5–50, preferably 5–10, microns to agglomerate into very large powder particles (over 100 microns in size) which caused a significant decrease in active surface area and hence decreased catalysis. Therefore, one aspect of the invention is to provide very high capacity MgNi based alloys prepared by mechanical alloying having a preferred powder particle size distribution. However, the instant invention is also specifically intended to include Ovonic MgNi based alloys in which higher capacities are obtained in merely a portion of the bulk. In other words, the subject invention is intended to cover situations in which only, for example, 75% or 50% or even 25% of the microstructure of the alloy exhibits intermediate range order while the remainder (25%, or 50% or even 75%, respectively) can include polycrystalline inclusions. This is because the extraordinary storage capacity and significantly reduced cost (by a factor of 10) of these alloys would permit the manufacture of a significant volume fraction thereof having polycrystalline inclusions and still one would obtain high hydrogen storage capacity and reduced cost vis-a-vis the other Ovonic families of $LaNi_5$ type and TiNi type systems.

Another aspect of the invention is the preparation of the Ovonic MgNi based alloys of the instant invention by rapid solidification, preferably by melt spinning, which may also be used in combination with mechanical alloying. The electrochemical performance of powder particles prepared from the melt spin process alone can be significantly increased if these powder particles are, additionally, mechanically alloyed and/or thermally annealed. For example, melt spun $Mg_{52}Ni_{39}Co_3Mn_6$ material was evaluated as having a hydrogen storage capacity of about 300 mAh/g. The microstructure of this material included a volume fraction characterized by intermediate range order with a significant additional volume fraction of polycrystalline inclusions as the result of the selected quench rate (a higher rate of quench provides for a greater degree of disorder). This material was then mechanical alloyed for two hours after which it yielded a storage capacity of 790 mAh/g. It may be possible to further optimize the melt spinning process to improve quenching and produce materials having the preferred microstructure without additional mechanical alloying. It is also possible to make the microstructure of the melt spun material amorphous and then either leave it in that amorphous state or subject it to an anneal to nucleate crystallization and obtain an optimum crystallite size.

The performance of this material is exceptional. To the inventors knowledge, no nickel metal hydride bulk material has previously been produced that was capable of such outstanding performance, including for example the aforementioned hydrogen storage capacity of close to 800 mAh/g. Commercial NiMH battery products only have the hydrogen storage capacity in the range of 250 to as high as 400 mAh/g. Additionally this particular method of producing high capacity alloys has another benefit, it is production intensive. Mechanical alloying alone may require several days of processing before the desired microstructure is attained. The process of melt spinning is extremely fast, as fast as conventional melting processes such as vacuum induction melting. (See, for example, U.S. Pat. No. 4,948, 423 to Fetcenko, Summer, and LaRocca.) Subsequent processing such as mechanical alloying, requires only two hours compared to the original mechanical alloying process alone which took 90 hours to achieve the desired microstructure.

One preferred embodiment of fabrication, melt spinning followed by mechanical alloying, is believed to achieve the same desired microstructure by taking very finely segregated polycrystalline inclusions resulting from the melt spin process alone and through a small amount of additional mechanical alloying, using solid state diffusion, substantially eliminating these polycrystalline inclusions in favor of the microstructure including a substantial volume fraction characterized by intermediate range order.

The inventors have shown through extensive analysis that many of the electrochemical properties of the MgNi Base Alloy can be controllably altered depending on the type and quantity of modifier elements selected for making the disordered negative electrode materials as well as precipitation conditions. In general, the Ovonic MgNiCoMn style negative electrode alloys of the present invention are much more resistant to degradation by poisoning than previous MgNi based alloys, a property that also contributes to long cycle life. It is believed that this material has so many active sites that the material resists poisoning because poisonous species can be bound to a number of these sites without significantly decreasing the total number of available active sites. The materials thus formed have a very low self discharge and hence good shelf life. However, we believe that the alloys of the present invention still remain susceptible to passivation and therefore future patent applications will deal with decreasing still further the passivation of the alloy.

The microstructure of materials can fall anywhere along the following continuum depending upon the degree of disorder thereof:

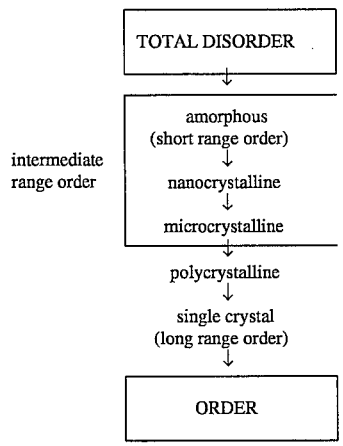

However, the inventors have determined that a microstructure including a substantial volume fraction characterized by intermediate range order is desirable to obtain optimum performance for the Ovonic MgNi based alloys of the present invention. For purposes of this invention, "microcrystalline" is specifically defined as material with crystallites having a size range of about 50–150 Å. "Amorphous" is specifically defined as material having short range order of less than 20 Angstroms. "Nanocrystalline" material has been defined above.

It is known that in the magnesium nickel system alone no naturally occurring intermetallic compound of approximately magnesium to nickel one to one is present. During solidification from the melt $Mg_2Ni$ or $MgNi_2$ may be precipitated. Neither of these phases has thermodynamic properties providing hydrogen bond strengths in a useful range for electrochemical purposes. As discussed in previous patents and patent applications on this subject we have determined that an approximate 1:1 ratio of Mg to Ni is preferable. This ratio can only be achieved by metastable processing such as by rapid solidification. We have determined that the glass transition temperature for this material exceeds 400° C. indicating that these materials will have sufficient stability for use in any high temperature operations likely to been seen by a rechargeable battery. (Typically, battery temperatures are rarely in excess of 100° C.)

Through high resolution imaging the inventors have determined that preferred materials of the present invention can be adequately described as exhibiting a microstructure including a substantial volume fraction characterized by intermediate range order. We have evidence that higher electrochemical capacities are achieved when the size of crystallites is smaller. That is to say, as compared to a microstructure of crystallites around 50–70 Å, capacity was increased when the size of the crystallites was reduced to the 20–50 Å range. Further evidence supporting this conclusion was gathered by x-ray diffraction analysis and electron diffraction of selected areas in conjunction with transmission electron microscopy. This increase in performance is not necessarily surprising if one takes into consideration the greatly increased surface area that becomes available for storing hydrogen. In material having such small crystallites, there is little or no difference between the surface and the bulk of the material.

As discussed in detail in copending U.S. Patent Application No. (obc 58.5) the most desirable metal electrolyte interface occurs in an Ovonic nickel metal hydride system when surface oxide is imbedded with metallic nickel regions typically in the range of 50 Å. This surface interface is highly desirable for catalytic gas recombination and general performance properties such as high rate and low temperature discharge. The inventors have been able to achieve a similar size catalytic structure in the bulk of the present invention when a substantial volume fraction of the base alloy consists of Ovonic MgNi material having crystallites of less than 50 Å in size.

An aspect of the present invention is a general approach for improving electrochemical alloy performance in MgNi based hydrogen storage materials. In Ovonic alloys of the TiVZrNi based system increased performance is typically related to corrosion reduction. In contrast, in the Ovonic MgNi based system, this problem must be approached from the opposite direction. That is, improved performance is related to reducing the tendency of such MgNi based alloys to passivate at the surface oxide. Passivation of the surface can be considered as formation of a thick, dense, insulating type of surface oxide unfavorable to electrochemical operation as distinguished from a thin, microporous, electrolyte interface having catalytic and metallic nickel regions.

Yet another aspect of the design of the materials of the present invention relates to the formation of the desirable microstructure described above. As stated earlier, microstructure analysis indicates that in unmodified binary MgNi alloys phase segregation occurs with large size crystallite inclusions having great differences in chemical composition from one phase to another. In contrast, the Ovonic compositions of the present invention are suited to fabrication via rapid solidification techniques. In general, in unoptimized disordered MgNi based alloy materials, there is some phase segregation during solidification, but the compositional differences between phases is significantly reduced and the amount, size, and distribution of the phases is finer and smaller compared to alloys of unmodified MgNi binary systems.

The inventors believe through optimization/increased modification of the chemical composition, the amount of phase segregation can be reduced to the point that the most preferred small, fine distribution of phases and crystallite sizes will be attainable solely through the use of rapid solidification and without the necessity of an additional mechanical alloying step as described below.

General performance can be improved by tailor making the surface oxide interface for desirable oxidation/passivation corrosion properties. An aspect of the present invention involves a new model for understanding the surface properties of Ovonic disordered negative electrode materials. One important consideration in formulating the alloys of the present invention involves insuring that the proper balance of corrosion and passivation characteristics exists. Reaching such a balance begins with viewing all Ovonic nickel metal hydride negative electrode systems as having a continuum of passivation and corrosion properties depending upon the elements used in any particular system. Such properties of typical base and modifier elements are shown in Table 1, below.

TABLE 1

| Passivation/Corrosion Properties | | |
| --- | --- | --- |
| highly passivating/ / / | / / / //////// / / / <operative window> | / / /highly corrosive |
| La, Ce, Pr, Nd, Mm, Mg | Zr, Mn, Cr, Fe, Ti | V, W, Mo |

With this knowledge, it is possible to formulate combinations of elements to modify electrode materials that will consequently have a proper balance of corrosion and passivation characteristics and fall within the "operative window" for a particular alloy. Ovonic TiNi type alloys have been optimized for such corrosion/passivation properties (see, for example U.S. Pat. Nos. 5,238,756 and 5,277,999, discussed above). Similarly, the production of Ovonic LaNi$_5$ type electrode materials required the introduction of modifiers to contribute corrosive properties and move these generally passivating alloys into the "operative window." (The term "operative window" is used to refer to the range of passivating and corrosion properties of negative electrode materials which provide for commercially acceptable electrochemical performance characteristics such as cycle life, power, etc. This operative window is unique for every nickel metal hydride alloy.) Modifying the characteristics of the surface oxide permits custom engineering of metal hydrogen bond strengths and improved catalysis and electrochemical stability such as cycle life.

Still another aspect of the chemical modification of this MgNi based alloy system will involve modifying the metallurgical properties thereof such as ductility, formation of surface area upon cycling, mechanical integrity and disintegration.

Table 2, below lists modifier groups I, II, III, and IV that address a number of elemental modifications possible in the MgNi based alloys of the present invention.

TABLE 2

| I | II | III | IV |
| --- | --- | --- | --- |
| Ca | V | B | Cu |
| Be | Ti | Bi | Th |
| Y | Zr | In | Si |
| | Cr | Sb | Zn |
| | Al | | Li |
| | Fe | | La |
| | Sn | | Ce |
| | | | Pr |
| | | | Nd |
| | | | Mm |
| | | | F |

Group I, Ca, Be, and Y can partially substitute for Mg. For instance, we expect that the substitution of an element like Ca for perhaps a small portion of the Mg will increase chemical disorder without significantly reducing the hydrogen storage capacity.

Group II elements permit the custom engineering of metal hydrogen bond strength, activation characteristics, and surface oxide characteristics. The choice of which element or elements in the group will have which specific effect is dependent on the other component elements for a particular Ovonic MgNi based alloy. In general, the effect of the Group II elements are closely interrelated. For example, Ovonic MgNi alloys yield significantly enhanced performance and exceptional bulk material capacity, but they still tend to passivate which indicates that further optimization is necessary to bring them more completely into the operative window. The inventors have shown that optimization of these alloys begins by imparting additional corrosion characteristics to the alloy surface. Such a course adjustment with MgNiCoMn alloys is achieved through the addition of corrosive elements such as V and Al. One can think of the addition of V and Al as useful for the course adjustment of corrosion/passivation properties. Fine adjustment in these MgNiCoMn alloys is achieved through the addition of elements such as Cr, Zr, Fe, Sn, Si, and Cu which can be used in combinations to achieve the correct balance between corrosion and passivation while maintaining good catalysis and metal hydrogen bond strength.

The elements in Group III, B, Bi, Sb and In are considered glass formers that effect the formation of crystalline lattices. As stated previously, Ovonic MgNiCoMn alloys have an improved tendency to avoid phase segregation during solidification. It may be possible to completely eliminate phase segregation through processing variations such as faster cooling rates and more careful control of ribbon thickness. Another approach is to provide a base alloy that has an improved resistance to phase segregation. The addition of Group III elements may assist in this regard. The introduction of B, for example, into the lattice network will eliminate or reduce the size of the crystal lattice networks of the material.

Finally, the Group IV elements affect metallurgical properties of the base alloy, particularly disorder, density of state, hardness, and ductility. U.S. Pat. No. 4,716,088 describes the concept of surface roughness and the desirability of in situ surface area formation and particular elements useful for controlling this property. In the Ovonic MgNi based alloys of the present invention, a similar effect (among others) may be achieved by the addition of Group IV elements such as Li, Zn, La, Ce, Pr, Nd, Mm, and F. Mg in the MgNi based alloys is a rather soft inductor metal. The addition of Group IV element(s) imparts a desirable amount of brittleness. In essence, the addition of Group IV element(s) changes the shape of the MgNi based alloy's stress-strain curve or toughness. As a result, when hydrogen is incorporated into the lattice of the alloy during initial charge/discharge cycling, this brittleness results in the formation of a high surface area through the formation of microcracks. This increase in surface area improves the surface catalysis and discharge rate characteristics.

Also included in the scope of the present invention is the use of various kinds of activation and etching treatments to improve electrochemical performance. U.S. Pat. No. 4,716,088 discloses that the performance of VTiZrNi based Ovonic alloys (which have a tendency to corrode) can be significantly improved by treating the electrode surface with an alkaline solution. In contrast, the subject MgNi based alloys have a tendency to passivate and an improper alkaline surface treatment could actually promote the formation of a thick dense nonporous oxide that would be undesirable for electrochemical charge discharge and catalysis. Thus, while alkaline etching according to the teachings of prior art is unacceptable for activation of the present MgNi based alloys, it is possible to activate MgNi based systems using an optimized alkaline etch treatment. Preferably an acid etch treatment is employed.

Such an acid etch involves contacting the electrode material (either the electrode itself or the alloy powder prior to fabricating the electrode) with an acidic solution such as hydrochloric acid for sufficient time and temperature to adjust the microporosity of the oxide surface. In some situations, the use of an acid treatment or any other type of solution that is capable of affecting the surface oxide of the electrode powder and/or final electrode will result in increased performance of the sealed cell. Typical etch conditions are exposing the electrode material to the hydrochloric etch for 2 hours at 50° C.

Also included in the present invention is the use of thermal annealing at appropriate times and temperatures to optimize the disordered MgNi alloys of the present invention by adjusting their microstructure. If, for example, it were observed for a particular alloy (produced using rapid solidification, mechanical alloying, rapid solidification/mechanical alloying, or any other method) that the microstructure was substantially amorphous, it would be desirable to thermally anneal the alloy to nucleate crystallite growth. Such thermal annealing may be performed on the alloy powder itself immediately after fabrication (via rapid solidification, mechanical alloying, rapid solidification/mechanical alloying, or any other method) as well as on fabricated negative electrode material.

In their most general form, a disordered MgNi based electrochemical hydrogen storage material of the present invention comprise materials having the composition of general formula (1):

$$(\text{Base Alloy})_a M_b \quad (1)$$

where, Base Alloy is an alloy of Mg and Ni in a ratio of from about 1:2 to about 2:1; M represents at least one modifier element chosen from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, and Ca; b is greater than 0.5 atomic percent and less than 30 atomic percent; and a+b=100 atomic percent; where said MgNi based electrochemical hydrogen storage material exhibits a microstructure including a volume fraction characterized by intermediate range order.

The affects of the addition of Co can be seen in such disordered negative electrode materials that have the composition of formula (2)

$$(\text{Base Alloy})_a Co_b \quad (2)$$

where b is 0.5 to 8.0 atomic percent, preferably 2.5 to 5.5 atomic percent. The presence of Co results in reduced oxide thickness; a conductive and/or catalytic component on the surface; and the reduction of species like the hydroxyl ion. While Co does oxidize and is soluble, it is also believed that cobalt oxide can act to inhibit the oxidation of other elements. Further, it is believed that in the alloys of the present invention, Co alters the microstructure in such a way as to introduce changes in the mutual solubility of the elements of these alloys, wherein hydrogen in a particular phase is not easily discharged either through low surface area, or an oxide of limited porosity or catalytic property. The addition of Co to disordered MgNi based alloys appreciably improves electrochemical hydrogen storage capacity.

The role of Mn is observed in such disordered negative electrode materials that have the composition of formula (3):

$$(\text{Base Alloy})_a Co_b Mn_c \quad (3)$$

where b is 0.1 to 8.5, preferably 2.5 to 5.5 atomic percent; c is 0.1 to 8.5, preferably 4.5 to 8.5 atomic percent; b+c≧0.5 atomic percent and a+b+c=100 atomic percent.

In the alloys of formula (3), the addition of Mn yields enhanced rate capability, low temperature performance, and increased hydrogen storage capacity. It is believed that when Mn is present, Mn assists the electrochemical discharge reaction at low temperature by promoting bulk diffusion of hydrogen at low temperature and also by catalyzing the reaction of hydrogen and hydroxyl ions at the alloy surface. A preferred embodiment of this material is $Mg_{52}Ni_{39}Co_3Mn_6$.

Other effects of the materials of the present invention are satisfied by such Ovonic negative electrode materials containing Al and V, having the composition $$(\text{Base Alloy})_a Co_b Mn_c Al_d V_e Li_f \quad (4)$$

where b=0.1 to 10.0, preferably 2.0 to 8.5 atomic percent; c=0.1 to 10.0, preferably 2.5 to 8.5 atomic percent; d=0.1 to 10.0, preferably 2.5 to 8.5 atomic percent; e=0.1 to 10, preferably 2.5 to 8.5 atomic percent; f=0.01 to 10, preferably 2.5 to 8.5 atomic percent; b+c+d+e+f≧0.5, preferably 2.5, atomic percent; and a+b+c+d+e+f=100 atomic percent.

In the materials of formula (4), the corrosion/passivation properties or the disordered MgNi system are shifted to a more corrosive region of the continuum, while excellent stability and catalysis is retained.

The disordered MgNi based alloy materials described by formulae (1) to (4) above, are part of the present invention only if they have a microstructure including a substantial volume fraction characterized by intermediate range order. Attaining this microstructure requires specific processing, such as the melt spinning or mechanical alloying or some combination of the two as described above. In contrast to these materials, the materials having a composition corresponding to formula (5) are not necessarily limited to a particular microstructure.

$$(Mg_{1-x}M'_xNi_{1-y-z}Co_yMn_z)_{1-a-b-c}M''_aM'''_bM^{iv}_c \quad (5)$$

where x is 0.01 to 6.0 atomic percent; y is 0.1 to 8.5, preferably 2.5 to 5.5 atomic percent; z is 0.1 to 10, preferably 4.5 to 8.5 atomic percent; a is 0.1 to 6 atomic percent; b is 0.01 to 2 atomic percent; c is 0.01 to 3 atomic percent; d is 0.01 to 8 atomic percent; M' is chosen from the group consisting of Ca, Be, and Y; M" is chosen from the group consisting of V, Ti, Zr, Cr, Al, Fe, and Sn; M''' is chosen from the group consisting of B, Bi, In, and Sb; and $M^{iv}$ is chosen from the group consisting of Cu, Th, Si, Zn, Li, La, Ce, Pr, Nd, Mm, and F.

Ovonic MgNi negative electrodes can be used in many types of hydrogen storage cells and batteries. These include flat cells having a substantially flat plate disordered negative electrode, a separator, and a positive electrode or counter electrode that is substantially flat and aligned to be in operative contact with the negative electrode; jelly-roll cells made by spirally winding a flat cell about an axis; and prismatic cells for use in electric vehicles, for example. The metal hydride cells of the present invention can use any appropriate container, and can be constructed, for example, of metal or plastic.

A 30 weight percent aqueous solution of potassium hydroxide is a preferred electrolyte.

In a particularly preferred embodiment, alloys used in conjunction with advanced separator materials as disclosed in U.S. Pat. No. 5,330,861 and/or advanced positive electrode materials as disclosed in U.S. Pat. Nos. 5,344,728 and 5,348,822 yield improved performance over prior art alloys for certain electrochemical applications.

Besides the improved performance characteristics discussed above, modification offers cost advantages of almost an order of magnitude compared to conventional metal hydride alloys. This is, of course, in addition to the cost reduction in resulting from the use of MgNi as the Base Alloy compared to previously described non-Mg based Ovonic alloys that are about ten times more expensive than MgNi materials.

EXAMPLES

The Ovonic MgNi based alloys described in the following examples all had the formula $Mg_{52}Ni_{39}Co_3Mn_6$. These materials were prepared in bulk using melt spinning rapid solidification and/or mechanical alloying (MA) as discussed in detail below. The MgNi base alloy materials were formed into negative electrode belt according to the method described in U.S. Pat. No. 4,915,898. The belt was assembled into trielectrode cells for testing and evaluation.

Example 1

Figure 2:
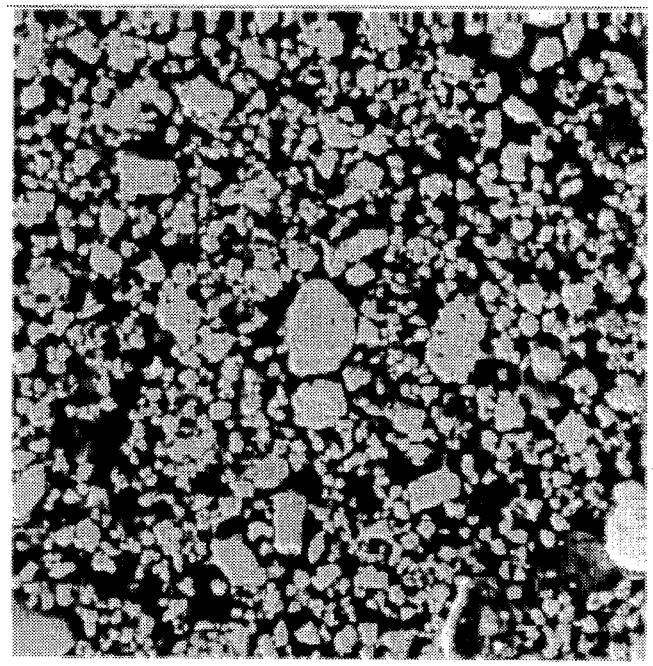
FIG. 2 is an SEM micrograph showing the microstructure of the materials of the present invention having no evidence of phase segregation.
Figure 3:
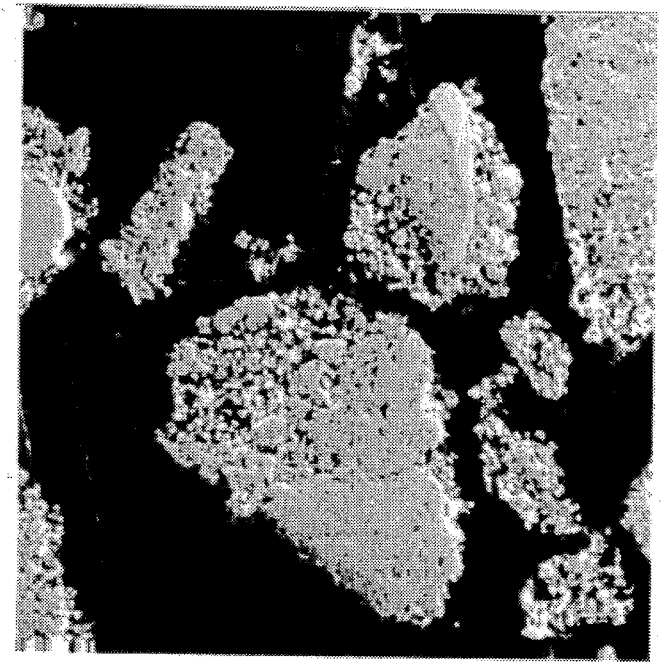
FIG. 3 shows the effect of excessive mechanical alloying.

MgNi based alloy bulk materials were formulated using the mechanical alloying process in an attritor. Samples were removed from the attritor at the times indicated in Table 3. The samples were analyzed using SEM and XRD to determine their microstructure and assembled into trielectrode cells to determine their capacity. The results of this analysis are shown in FIGS. 1–3 and the results from the electrochemical test are summarized in Table 3.

TABLE 3

| grinding time (hrs) | mAh/g |
|---|---|
| 25 | 140 |
| 42 | 372 |
| 93 | 632 |
| 164 | 588 |

This example shows that an optimum grinding time is attained after which the performance of the materials begins to degrade.

The preferred intermediate range order microstructure of these materials can be seen in the superimposed XRD spectra of FIG. 1.

The micrographs from the SEM analysis are shown in FIGS. 2 and 3. FIG. 2 shows substantially homogeneously distributed crystallites of the material nearly at its optimum capacity in a sample of material taken after 90 hours of mechanical alloying. FIG. 3 shows the effect 164 hours of mechanical alloying. The fine particle structure of the alloy has been destroyed: the substantially homogeneously distributed crystallites have agglomerated or "clumped" together.

The preferred alloys of the present invention have fine alloy particles exhibiting a microstructure including a substantial volume fraction characterized by intermediate range order.

Example 2

Bulk MgNi disordered negative electrode materials were rapidly solidified by melt spinning. Raw materials in the powder form were put into a boron nitride crucible and heated to a temperature of about 1050° C. The melt was injected onto a fast spinning wheel (turning at 34 m/s) that was cooled by continuously running water. The resulting ribbons and flakes were collected at the bottom of the chamber and pressed onto a nickel wire screen, compacted, and sintered to form disordered negative electrodes. These disordered negative electrodes were assembled into trielectrode cells. These cells were cycled. The results are presented in Table 4, below.

TABLE 4

| Capacity as a Function of Discharge Rate | | |
|---|---|---|
| discharge rate (mA/g) | capacity (mAh/g) Sample 1 | capacity (mAh/g) Sample 2 |
| 6 | 77 | 64 |
| 3 | 294 | 170 |
| 1.5 | 323 | 254 |

Example 3

Bulk MgNi negative electrode materials were prepared by combining melt spinning and mechanical alloying. The material from the melt spin as described in example 2, was put in the attritor and ground for two hours. The resulting materials were pressed onto a nickel wire screen and compacted to form disordered negative electrodes. These disordered negative electrodes were assembled into trielectrode cells. These cell were tested based on an initial charge of 50 mA/g for 25 hours. The results are shown in Table 5, below.

TABLE 5

Capacity as a Function of Discharge Rate

| discharge rate (mA/g) | capacity (mAh/g) Sample 1 | capacity (mAh/g) Sample 2 |
|---|---|---|
| 50 | 492 | 585 |
| 24 | 598 | 693 |
| 12 | 689 | 769 |
| 3 | 709 | 791 |

Figure 4:
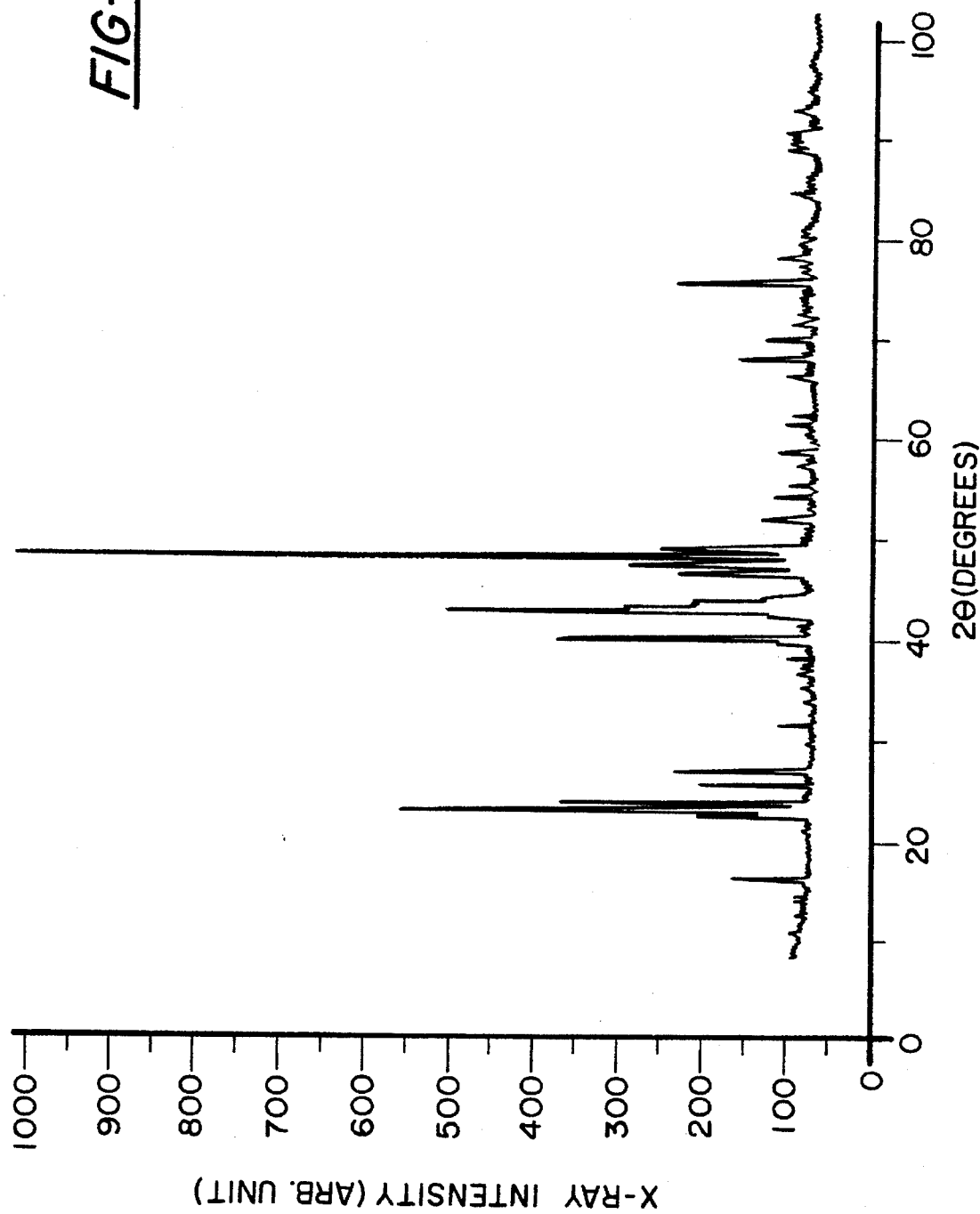
FIG. 4 is an XRD of melt spun materials showing their polycrystalline microstructure.
Figure 5:
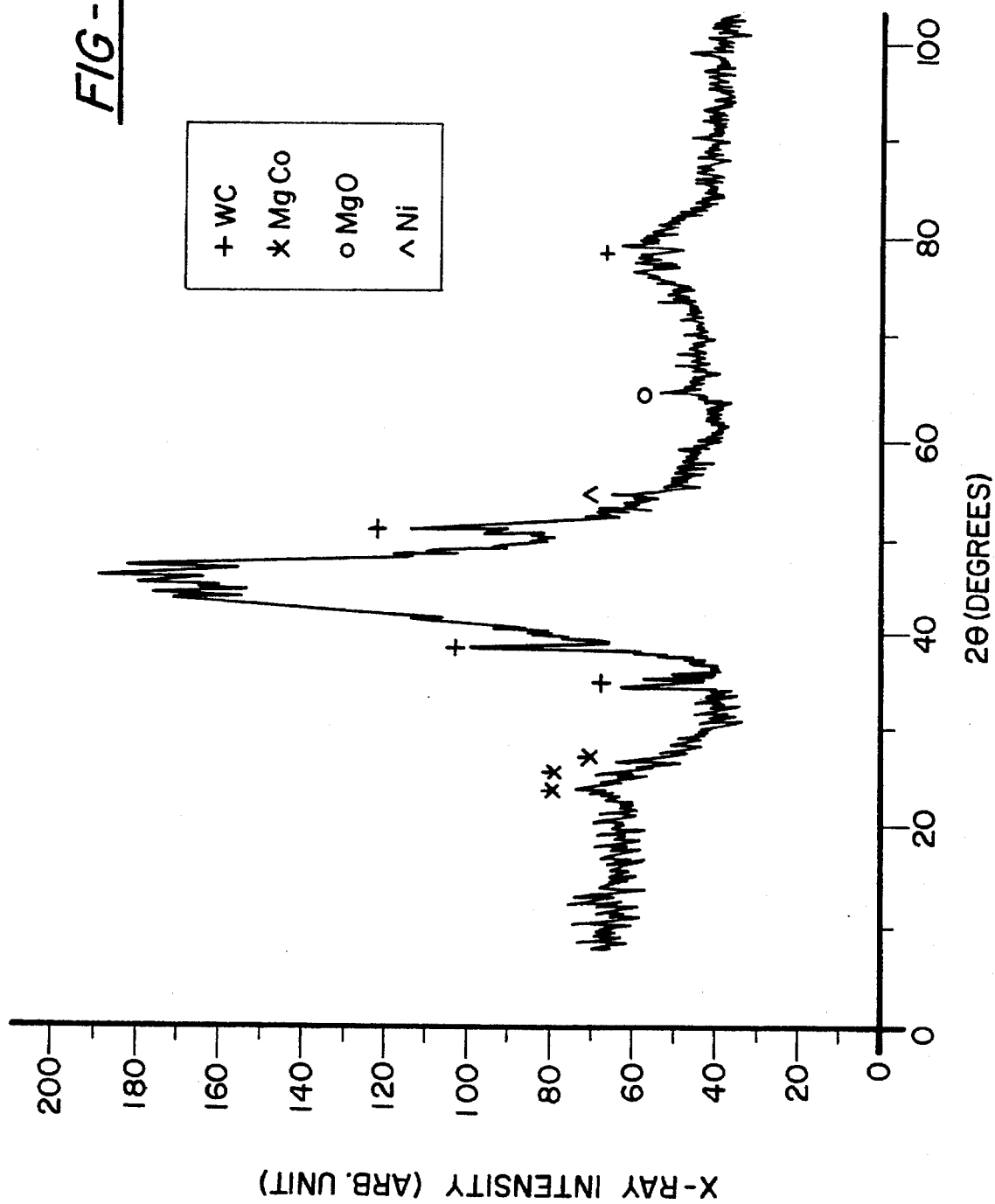
FIG. 5 is an XRD showing melt spun/mechanically alloyed materials having the desired microstructure.

The microstructure of these materials was analyzed using XRD. The melt spun materials had a microstructure characterized by a volume fraction of substantially polycrystalline inclusions as shown in FIG. 4. In contrast, the melt spun/mechanical alloyed materials had the desired microstructure including a substantial volume fraction characterized by intermediate range order as shown in FIG. 5.

Example 4

As an additional comparison, a cell was prepared using an Ovonic negative electrode having the formula $V_{18}Ti_{15}Zr_{18}Ni_{29}Cr_5Co_7Mn_8$. This cell was charged at 50 mA/g for 25 hour shown in Table 6.

TABLE 6

Capacity as a Function of Discharge Rate

| discharge rate (mA/g) | capacity (mAh/g) Sample 1 |
|---|---|
| 50 | 262 |
| 24 | 342 |
| 12 | 402 |
| 3 | 421 |

As can be seen by comparing the data from Examples 2–4, the disordered MgNi material of the present invention prepared using melt spinning/mechanical alloying had astounding initial maximum capacities of between 700–800 mAh/g. In contrast, with the material which was only mechanical alloyed, the material with was only melt spun, and the $V_{18}Ti_{15}Zr_{18}Ni_{29}Cr_5Co^7Mn^8$ material had much lower maximum capacities.

Such a comparison shows that not only does the melt spun/mechanical alloyed material have higher capacity than the mechanical alloyed and the $V_{18}Ti_{15}Zr_{18}Ni_{29}Cr_5Co^7Mn_8$ materials, but the melt spun/mechanically alloyed material is more economical to produce because it can be manufactured in a much shorter period of time as shown above. It is believed that additional cost reduction can be attained because alloys prepared using melt spinning/mechanical alloying do not need to be hydrided (for particle size reduction as described in U.S. Pat. No. 4,893,756) and for some applications will not require sintering.

Example 5

While gas phase storage of hydrogen does not guarantee that a particular material is capable of storing hydrogen in an electrochemical cell, gas phase storage can be a useful technique for evaluating the limits of hydrogen storage for known electrochemical materials. Usually, the measured storage capacity of gaseous hydrogen can be used as an indicator of the upper limit of the electrochemical energy density in a wet cell.

The hydrogen storage materials described above were prepared in bulk by melt spinning, MA, and melt spinning/MA. Equal measured amounts of the resulting powders were placed in a stainless steel tubing, heated to 300° C. and then cooled to room temperature in an $H_2$ atmosphere. The amount of hydrogen storage was calculated from the difference in the vessel pressure. The results of these measurements are shown in Table 7, below.

TABLE 7

| Preparation Method | Weight Percent of $H_2$ Absorbed |
|---|---|
| melt spinning | 1.2 |
| mechanical alloying | 2.7 |
| melt spinning/mechanical alloying | 2.7 |

Example 6

In order to investigate the microstructure of the melt spun and melt spun/mechanically alloyed materials, samples of these materials were prepared and examined using a scanning electron microscope. The results of these examinations are shown in FIGS. 6–10.

Figure 6:
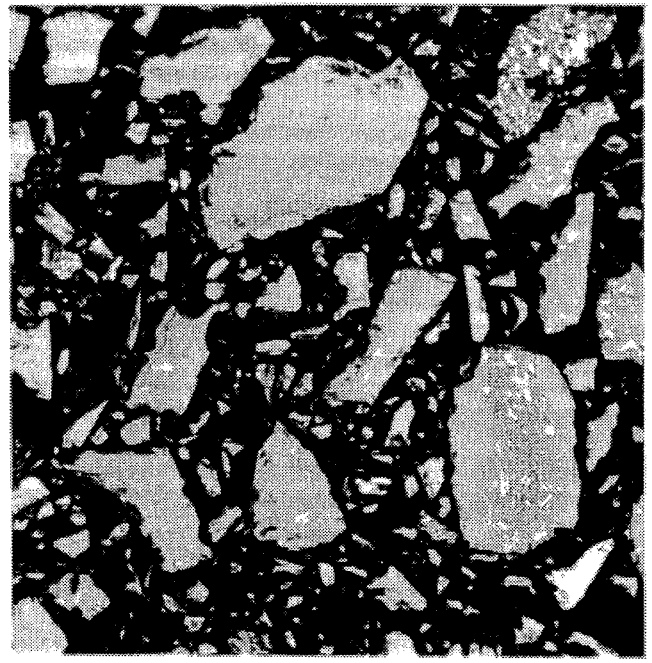
FIG. 6 shows material that has only been melt spun that exhibits fine crystals as well as regions of polycrystalline materials.

FIG. 6 shows material that has only been melt spun. This material exhibits a number of regions having a microstructure characterized by featureless amorphous regions, fine crystals, as well as regions of phase segregated polycrystallites that are over 100 microns in size.

Figure 7:
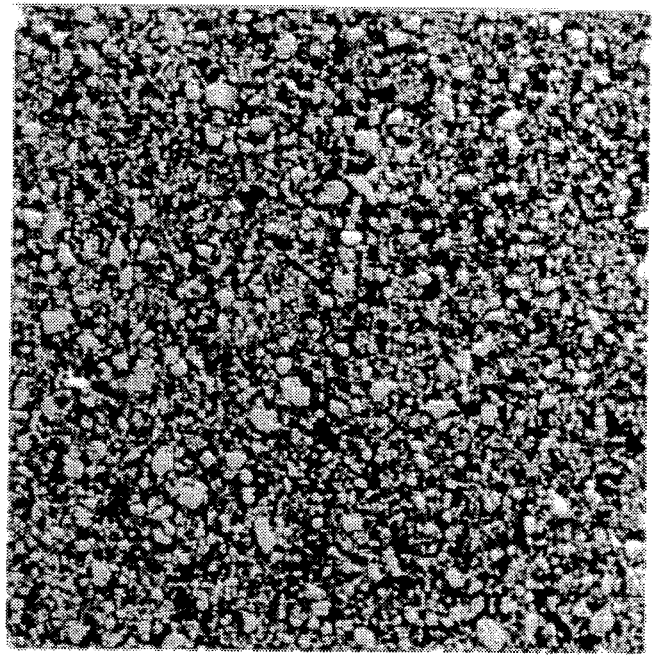
FIG. 7 shows the material of FIG. 6 following two hours of mechanical alloying, that is characterized by crystallites exhibiting intermediate range order and having a powder size distribution ranging from about 5–15 microns in size.

In contrast, the same material following only two hours of mechanical alloying exhibits, as shown in FIG. 7, a microstructure including a substantial volume fraction characterized by intermediate range order with the fine powder distribution of 1–20 microns in size.

Figure 8:
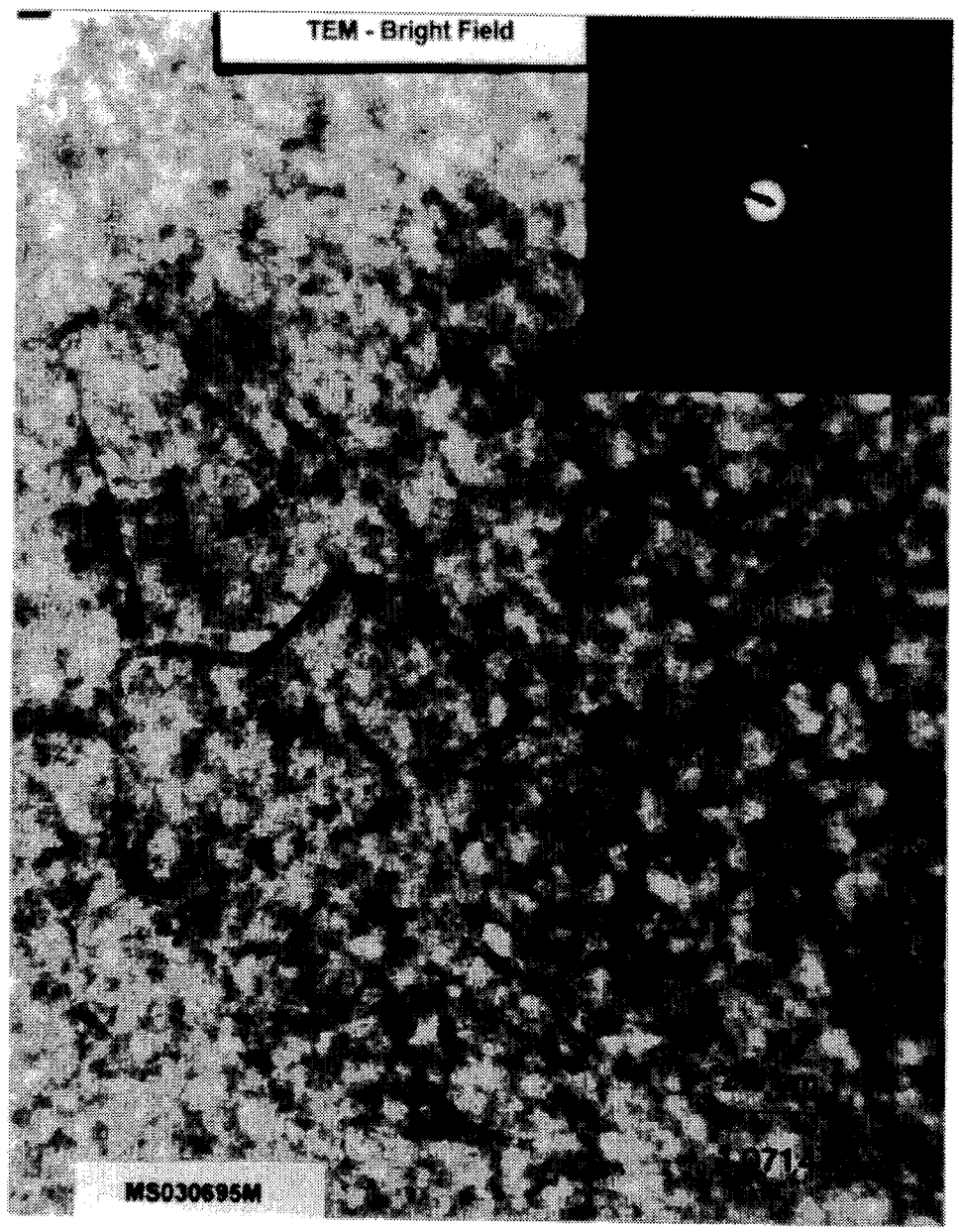
FIG. 8 is a TEM Bright Field micrograph and its corresponding SAD pattern in which the sized of the preferred melt spun/mechanically alloyed materials are shown.

FIG. 8 is a TEM Bright Field micrograph in which the preferred disordered MgNi materials prepared by melt spinning/mechanical alloying are shown at 1,017,430 X. This micrograph shows the presence of nanocrystallites, generally from about 20–50 Å in size, amorphous regions about 0–20 Å in size and microcrystalline crystallites about 50–100 Å in size. Polycrystalline regions are substantially absent. The presence of such immediate range order represents an important aspect of the present invention. It is believed that this intermediate range order is responsible for the extremely high capacity and rate capability of the disordered MgNi based materials of the present invention.

Figure 9:
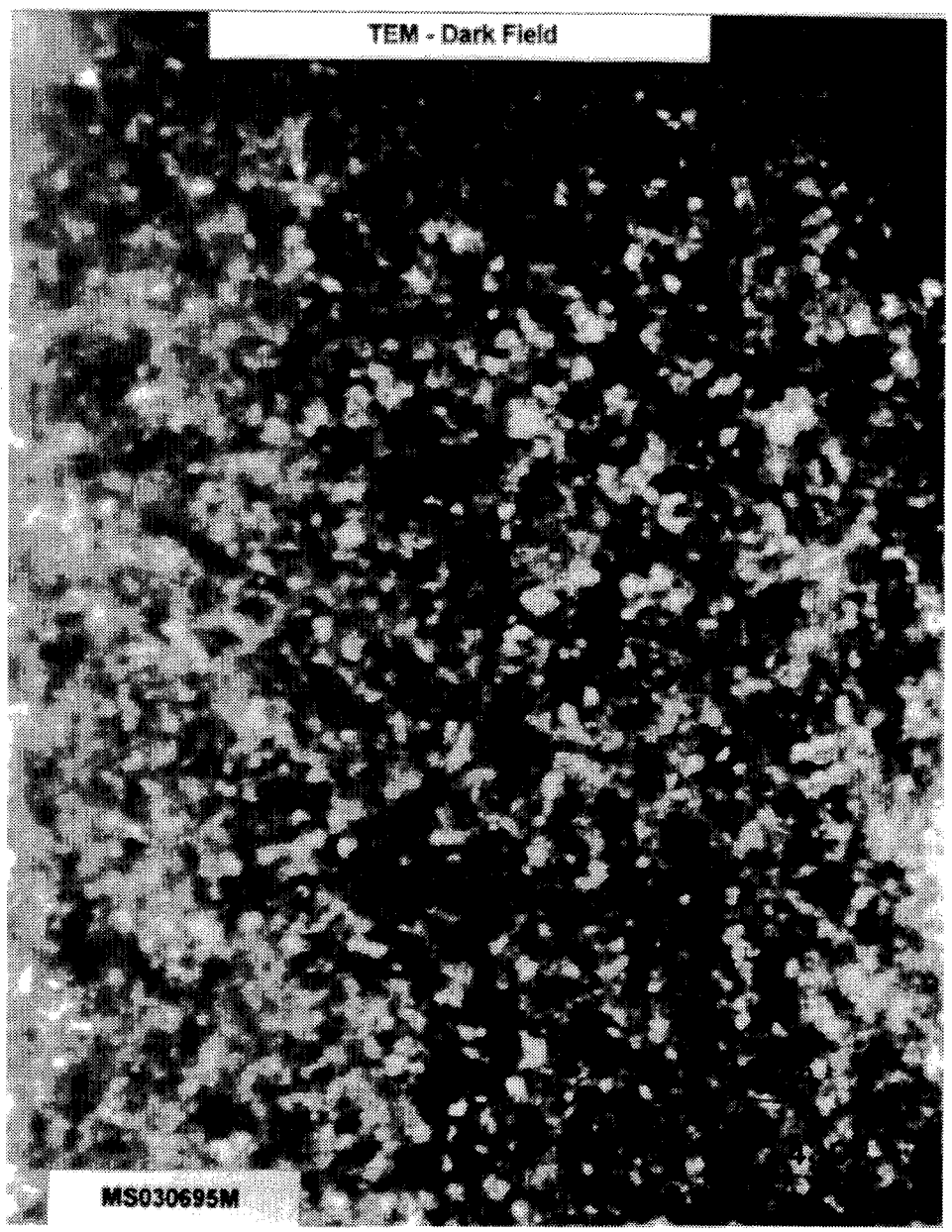
FIG. 9 is a TEM Dark Field micrograph recorded from the same areas as shown in FIG. 8 in which presents the overall range of the crystallites as 20–50 Å for melt spun/mechanically alloyed materials of the present invention.

FIG. 9 is a TEM Dark Field micrograph in which the preferred disordered MgNi materials prepared by melt spinning/mechanical alloying are shown at 1,071,430 X. This micrograph clearly presents the overall range of a substantial portion of the crystallites as about 20–50 Å.

Figure 10:
FIG. 10 is a TEM Bright Field micrograph that shows the lattice interference fringes of 50 Å crystallites of MgNi-CoMn in the bulk melt spun/mechanically alloyed material.

FIG. 10 is a TEM Bright Field micrograph in which the preferred disordered MgNi materials prepared by melt spinning/mechanical alloying are shown at 4,200,000 X. This micrograph shows the lattice interference fringes of 20–50 Å crystallites of MgNiCoMn on the surface of the bulk material. As discussed in U.S. Patent Application No. (obc 58.5) Ni regions on the surface of the alloy play a significant role in increasing catalysis. As discussed above, in the present materials, MgNiCoMn regions in the bulk perform this same function.

Example 7

Corrosion measurements were conducted using electrodes fabricated from the alloys listed in Tables 8 and 9. These alloys were prepared as sputtered thin films (~1 micron)

deposited onto one face of a nickel substrate. The face (2 cm$^2$ in area) which included the alloy film was exposed to the electrolyte solution. The opposite face was protected from contact with the electrolyte by a coating of epoxy resin.

The corrosion potentials ($E_{corr}$) and corrosion currents ($i_{corr}$) of these electrodes were measured using an EG&G PARC Model 350A corrosion measurement instrument. The measurements were conducted in 30% KOH solution. The corrosion potential of each electrode was determined by measuring the open circuit potential against a Hg/HgO reference electrode. The corrosion currents were measured using the polarization resistance (linear polarization) technique. This technique was performed by applying a controlled-potential scan of 0.1 mV/sec over a ±20 mV range with respect to $E_{corr}$. The resulting current was plotted linearly versus the potential. The slope of this potential current function at $E_{corr}$ is the Polarization Resistance ($R_p$). $R_p$ was used together with the Tafel Constant β (assumed as 0.1 V/decade) to determine $i_{corr}$ using the formula $R_p = \beta_A \beta_c / (2.3 (i_{corr})(\beta_A + \beta_c))$. The corrosion currents were calculated for these samples and are shown in Table 8.

TABLE 8

CORROSION CURRENTS

| Alloy | $i_{corr}$ (μA/cm$^2$) |
|---|---|
| $Mg_{52}Ni_{39}Co_3Mn_6$ | 1.8 |
| $Mg_{42}Ni_{58}$ | 19 |
| $Mg_{52}Ni_{48}$ | 28 |
| $Mg_{55}Ni_{45}$ | 61 |
| $Ti_{10}Zr_{28}Ni_{36}Cr_5Co_5Mn_{16}$ | 0.38 |

The corrosion potentials for these samples are shown in Table 9.

TABLE 9

CORROSION POTENTIALS

| Alloy | $E_{corr}$ (V) |
|---|---|
| $Mg_{52}Ni_{39}Co_3Mn_6$ | −0.751 |
| $Mg_{42}Ni_{58}$ | −0.781 |
| $Mg_{52}Ni_{48}$ | −0.736 |
| $Mg_{55}Ni_{45}$ | −0.813 |
| $Ti_{10}Zr_{28}Ni_{36}Cr_5Co_5Mn_{16}$ | −0.750 |

This example demonstrates the effectiveness of chemical modification in the MgNi based alloys of the present invention in reducing corrosion potential as well as corrosion current compared to binary MgNi.

Example 8

The effect of microstructure on the degree of passivation for a representative alloy was studied. Bulk alloy material having the composition $Mg_{52}Ni_{39}Co_3Mn_6$ was prepared using mechanical alloying, melt spinning, and gas atomization. The mechanically alloyed material had a microstructure including a substantial volume fraction characterized by intermediate range order. In contrast, both the melt spun and gas atomized material were substantially polycrystalline.

The Degree of Passivation of the samples described in Table 10 was evaluated from the performance of the polarization curve around the corrosion potential at a range of ±20 mV as described earlier. Due to passivation of the alloys, the polarization curves deviate from a linear behavior as the electrodes are polarized to more anodic potentials. The larger the corrosion/passivation current, the larger the deviation from linearity. The degree of passivation of the alloys was evaluated by dividing the actual oxidation (anodic) current by the linear current. This parameter is presented in Table 10 for the different bulk materials.

TABLE 10

Degree of Passivation

| Alloy | Degree of Passivation |
|---|---|
| $Mg_{52}Ni_{39}Co_3Mn_6$ - MA (intermediate range order) | 0.28 |
| $Mg_{52}Ni_{39}Co_3Mn_6$ - melt spinning (polycrystalline) | 0.44 |
| $Mg_{52}Ni_{39}Co_3Mn_6$ gas atomization (polycrystalline) | 0.44 |

This example demonstrates that not only composition, but structure as well, also improved passivation resistance.

Example 9

Based on lengthy experience working with disordered materials as well as the specific MgNi disclosed herein, the inventors appreciate that additional methods of fabricating Ovonic MgNi based alloys having the preferred microstructure and hence demonstrating the unexpected storage capacity and other electrochemical performance characteristics are possible. The purpose of this example is to disclose a method of preparation employing rapid solidification followed by thermal annealing at an appropriate time and temperature to obtain the 20–50 Å crystallites defined by earlier examples as optimizing electrical performance. The thermal annealing may be performed on the alloy powder itself immediately after rapid solidification as well as on fabricated negative electrode material.

In view of the above, it is obvious to those skilled in the art that the present invention identifies and encompasses a range of alloy compositions which, when incorporated as a disordered negative electrode in metal hydride cells results in batteries having improved performance characteristics.

The drawings, discussion, descriptions, and examples of this specification are merely illustrative of particular embodiments of the invention and are not meant as limitations upon its practice. It is the following claims, including all equivalents, that define the scope of the invention.

What is claimed is:

1. A disordered multicomponent MgNi based electrochemical hydrogen storage material comprising:

(Base Alloy)$_a$M$_b$ where,

Base Alloy is an alloy of Mg and Ni in a ratio of from about 1:2 to about 2:1;

M represents at least one modifier element chosen from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, and Ca;

b is greater than 0.5 atomic percent and less than 30 atomic percent; and a+b=100 atomic percent; and wherein at least 25% of the microstructure of said disordered MgNi based electrochemical hydrogen storage material exhibits intermediate range order.

2. The MgNi based electrochemical hydrogen storage material of claim 1, wherein the portion of said microstructure that does not exhibit intermediate range order includes polycrystalline inclusions.

3. The MgNi based electrochemical hydrogen storage material of claim 1, where the microstructure of said material provides additional numbers of active sites.

4. The MgNi based electrochemical hydrogen storage material of claim 1, wherein said material comprises powder particles that are from 1–75 microns in size.

5. The MgNi based electrochemical hydrogen storage material of claim 4, wherein said powder particles average from 5–38 microns in size.

6. The MgNi based electrochemical hydrogen storage material of claim 1, wherein said material comprises a combination of amorphous regions, nanocrystallites, and microcrystallites varying from 0–100 Å in size.

7. The MgNi based electrochemical hydrogen storage material of claim 1, wherein said material comprises crystallites that are primarily nanocrystallites and polycrystallites from 20–100 Å in size.

8. The MgNi based electrochemical hydrogen storage material of claim 1, wherein said at least one modifier is Co and b=0.5 to 8.0 atomic percent.

9. The MgNi based electrochemical hydrogen storage material of claim 1, wherein said at least one modifier is Co and Mn.

10. The MgNi based electrochemical hydrogen storage material of claim 1, wherein said ratio of Mg and Ni is about 1:1.

11. The MgNi based electrochemical hydrogen storage material of claim 1, wherein said material is etched following fabrication using an acid etch.

12. The MgNi based electrochemical hydrogen storage material of claim 11, wherein said material is etched after it has been formed into a negative electrode using an acid etch.

13. The MgNi based electrochemical hydrogen storage material of claim 1, comprising:

$$(Base\ Alloy)_a Co_b Mn_c$$

wherein b=0.1 to 8.5 atomic percent:

c=0.1 to 8.5 atomic percent;

b+c≧0.5 atomic percent; and a+b+c=100 atomic percent.

14. The MgNi based electrochemical hydrogen storage material of claim 13, wherein b=2.5 to 5.5 atomic percent, and c=4.5 to 8.5 atomic percent.

15. The MgNi based electrochemical hydrogen storage material of claim 1, wherein said materials have the formula $$Mg_{52}Ni_{39}Co_3Mn_6.$$

16. A disordered multicomponent MgNi based electrochemical hydrogen storage material comprising:

$$(Mg_{1-x}M'_x Ni_{1-y-z} Co_y Mn_z)_{1-a-b-c} M''_a M'''_b M^{iv}_c$$

where x is 0.01 to 6.0 atomic percent;

y is 0.1 to 8.5, preferably 2.5 to 5.5 atomic percent;

z is 0.1 to 10, preferably 4.5 to 8.5 atomic percent;

a is 0.1 to 6 atomic percent;

b is 0.01 to 2 atomic percent;

c is 0.01 to 3 atomic percent;

d is 0.01 to 8 atomic percent;

M' is chosen from the group consisting of Ca, Be, and Y;

M'' is chosen from the group consisting of V, Ti, Zr, Cr, Al, Fe, and Sn;

M''' is chosen from the group consisting of B, Bi, In, and Sb; and $M^{iv}$ is chosen from the group consisting of Cu, Th, Si, Zn, Li, La, Ce, Pr, Nd, Mm, and F.

17. The MgNi based electrochemical hydrogen storage material of claim 16, where x is 0.1 to 6.0 atomic percent;

y is 2.5 to 5.5 atomic percent; and z is 4.5 to 8.5 atomic percent.

18. The MgNi based electrochemical hydrogen storage material of claim 16, where said material is etched following fabrication using an acid etch.

19. The MgNi based electrochemical hydrogen storage material of claim 16, where said material is etched after said material has been formed into a negative electrode using an acid etch.

20. An electrochemical hydrogen storage cell comprising:

a disordered multicomponent negative electrode comprising an alloy of Mg and Ni in a ratio of from about 1:2 to about 2:1; and at least one modifier element chosen from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, and Ca where the total mass of said at least one modifier is greater than 0.5 atomic percent and less than 30 atomic percent of said alloy; where at least 25% of the microstructure of said disordered MgNi based electrochemical hydrogen storage material exhibits intermediate range order;

a positive electrode; and a separator.

21. The electrochemical hydrogen storage cell of claim 20, wherein the portion of said microstructure that does not exhibit intermediate range order includes hydrogen storage material further includes a volume fraction of said microstructure polycrystalline inclusions.

22. The electrochemical hydrogen storage cell of claim 20, wherein the microstructure of said disordered MgNi material provides additional numbers of active sites.

23. The electrochemical hydrogen storage cell of claim 20, wherein said disordered MgNi based electrochemical hydrogen storage material comprises powder particles that are less than 38 microns in size.

24. The electrochemical hydrogen storage cell of claim 20, wherein said disordered MgNi based electrochemical hydrogen storage material comprises powder particles around 5–20 microns in size.

25. The electrochemical hydrogen storage cell of claim 20, wherein said disordered MgNi based electrochemical hydrogen storage material comprises crystallites that are primarily from 0–70 Å in size.

26. The electrochemical hydrogen storage cell of claim 20, wherein said disordered MgNi based electrochemical hydrogen storage material comprises crystallites that are primarily from 20–50 Å in size.

27. A method for fabricating a disordered multicomponent MgNi based electrochemical hydrogen storage material comprising the steps of:

rapidly solidifying an alloy of Mg and Ni in a ratio of from about 1:2 to about 2:1 to form power particles, where said alloy is modified using at least one modifier element chosen from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, and Ca where the total mass of said at least one modifier element is greater than 0.5 atomic percent and less than 30 atomic percent; and mechanically alloying the powder particles of the rapidly solidified melt spun alloy;

wherein at least 25% of the microstructure the rapidly solidified/mechanically alloyed alloy exhibits intermediate range order.

28. The method of claim 27, wherein said hydrogen storage material is fabricated the portion of said microstructure that does not exhibit intermediate range order includes polycrystalline inclusions.

29. The method of claim 27, wherein said step of rapidly solidifying is accomplished using melt spinning.

30. The method of claim 27, further comprising the step of etching the rapidly solidified/mechanically alloyed alloy using an acid etch.

31. The method of claim 27, further comprising the step of thermally annealing the rapidly solidified/mechanically alloyed alloy.

32. The method of claim 27, further comprising the step of etching the rapidly solidified/mechanically alloyed alloy after said alloy has been formed into a negative electrode.

33. The method claim 27, further comprising the step of thermally annealing the rapidly solidified/mechanically alloyed alloy after said alloy has been formed into a negative electrode.

34. The method of claim 27, wherein the rapidly solidified/mechanically alloyed alloy comprises powder particles that are from 1–75 microns in size.

35. The method of claim 27, wherein the rapidly solidified/mechanically alloyed alloy comprises powder particles that are from 5–38 microns in size.

36. The method of claim 27, wherein the rapidly solidified/mechanically alloyed alloy comprises crystallites that are primarily from 0–70 Å in size.

37. The method of claim 27, wherein the rapidly solidified/mechanically alloyed alloy comprises crystallites that are primarily from 20–50 Å in size.

38. A method for fabricating a disordered multicomponent MgNi based electrochemical hydrogen storage material comprising the steps of:

rapidly solidifying an alloy of Mg and Ni in a ratio of from about 1:2 to about 2:1 modified using at least one modifier element chosen from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, and Ca where the total mass of said at least one modifier element is greater than 0.5 atomic percent and less than 30 atomic percent;

wherein at least 25% of the rapidly solidified alloy exhibits intermediate range order.

39. The method of claim 38, wherein said hydrogen storage material is fabricated such that the portion of said microstructure that does not exhibit intermediate range order includes polycrystalline inclusions.

40. The method of claim 38, wherein said step of rapidly solidifying is accomplished using melt spinning.

41. The method of claim 38, further comprising the step of etching the rapidly solidified alloy using an acid etch.

42. The method of claim 38, further comprising the step of thermally annealing the rapidly solidified alloy.

43. The method of claim 38, further comprising the step of etching the rapidly solidified alloy after said alloy has been formed into a negative electrode.

44. The method of claim 38, further comprising the step of thermally annealing the rapidly solidified alloy after said alloy has been formed into a negative electrode.

45. The method of claim 38, where the rapidly solidified alloy comprises powder particles that are less than 38 microns in size.

46. The method of claim 38, where the rapidly solidified alloy comprises powder particles that are from 1–75 microns in size.

47. The method of claim 38, where the rapidly solidified alloy comprises crystallites that are primarily from 0–70 Å in size.

48. The method of claim 38, wherein the rapidly solidified alloy comprises crystallites that are primarily from 20–50 Å in size.

49. A method for fabricating a disordered multicomponent MgNi based electrochemical hydrogen storage material comprising the steps of:

mechanically alloying an alloy of Mg and Ni in a ratio of from about 1:2 to about 2:1 modified using at least one modifier element chosen from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, and Ca where the total mass of said at least one modifier element is greater than 0.5 atomic percent and less than 30 atomic percent;

where at 25% of the microstructure of the mechanically alloyed alloy exhibits intermediate range order.

50. The method of claim 49, wherein said hydrogen storage material is fabricated such that the portion of said microstructure that does not exhibit intermediate range order includes polycrystalline inclusions.

51. The method of claim 49, where said step of mechanically alloying is accomplished using an attritor.

52. The method of claim 49, further comprising the step of etching the mechanically alloyed alloy using an acid etch.

53. The method of claim 49, further comprising the step of thermally annealing the mechanically alloyed alloy.

54. The method of claim 49, further comprising the step of etching the mechanically alloyed powder after said alloy has been formed into a negative electrode.

55. The method of claim 49, further comprising the step of thermally annealing the mechanically alloyed alloy using an acid etch after said alloy has been formed into a negative electrode.

56. The method of claim 49, where the mechanically alloyed alloy comprises powder particles that are less than 38 microns in size.

57. The method of claim 49, where the mechanically alloyed alloy comprises powder particles that are around 5 microns in size.

58. The method of claim 49, where the mechanically alloyed alloy comprises crystallites that are primarily from 0–70 Å in size.

59. The method of claim 49, where the mechanically alloyed alloy comprises crystallites that are primarily from 20–50 Å in size.

60. A method of activating disordered, multicomponent negative nickel metal hydride electrode material characterized by the step of subjecting said electrode material to an acid etch.

61. The method of claim 60, where the disordered, multicomponent electrode material is selected from the group consisting: LaNi$_5$-[type]based materials, TiNi-[type] based materials, and MgNi-[type]based materials.

62. A disordered multicomponent MgNi based electrochemical hydrogen storage material comprising:

$$(\text{Base Alloy})_a M_b$$

where,

Base Alloy is an alloy of Mg and Ni in a ratio of from about 1:2 to about 2:1;

M represents at least one modifier element chosen from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, and Ca;

b is greater than 0.5 atomic percent and less than 30 atomic percent; and a+b=100 atomic percent; and where said disordered MgNi based electrochemical hydrogen storage material exhibits intermediate range order, and comprises powder particles that are from 1–75 microns in size.

63. The MgNi based electrochemical hydrogen storage material of claim 62, wherein said powder particles average from 5–38 microns in size.

64. The MgNi based electrochemical hydrogen storage material of claim 62, wherein said material comprises amorphous regions, nanocrystallites, and microcrystallites that are from 0–100 Å in size.

65. The MgNi based electrochemical hydrogen storage material of claim 64, wherein said material comprises nanocrystallites that are from 20–100 Å in size.

* * * * *